United States Patent [19]

Tanaka et al.

[11] Patent Number: 4,514,452
[45] Date of Patent: Apr. 30, 1985

[54] MAGNETIC RECORDING DISK

[75] Inventors: Kazuhiro Tanaka; Ken-ichi Kawakami; Toshiya Yoshii, all of Ohtsu, Japan

[73] Assignee: Toray Industries, Inc., Tokyo, Japan

[21] Appl. No.: 599,136

[22] Filed: Apr. 11, 1984

[30] Foreign Application Priority Data

Apr. 20, 1983 [JP] Japan .................. 58-68299

[51] Int. Cl.³ .............................................. G11B 5/70
[52] U.S. Cl. .................... 428/141; 360/134; 360/135; 360/136; 427/128; 427/131; 428/143; 428/172; 428/212; 428/216; 428/220; 428/332; 428/335; 428/336; 428/480; 428/483; 428/533; 428/694; 428/695; 428/900; 428/910
[58] Field of Search ............... 428/694, 695, 483, 480, 428/523, 141, 143, 172, 212, 216, 335, 336, 900, 910, 220, 332; 427/131, 128; 360/134–136

[56] References Cited

U.S. PATENT DOCUMENTS

| | | | |
|---|---|---|---|
| 3,310,421 | 3/1967 | Flowers | 428/694 |
| 3,900,653 | 8/1975 | Riboulet | 428/409 |
| 3,983,285 | 9/1976 | Riboulet | 428/900 |
| 4,067,855 | 1/1978 | Miwa et al. | 260/75 |
| 4,138,386 | 2/1979 | Motegi et al. | 260/40 |
| 4,198,458 | 4/1980 | Mitsuishi | 428/480 |
| 4,223,361 | 9/1980 | Zaitsu et al. | 360/133 |
| 4,348,446 | 9/1982 | Mitsuishi | 428/694 |
| 4,411,945 | 10/1983 | Akao | 428/408 |

FOREIGN PATENT DOCUMENTS

| | | | |
|---|---|---|---|
| 40848 | 11/1972 | Japan | 428/694 |
| 15770 | 11/1972 | Japan | 428/694 |

Primary Examiner—Ellis P. Robinson
Attorney, Agent, or Firm—Armstrong, Nikaido, Marmelstein & Kubovcik

[57] ABSTRACT

A magnetic recording disk is disclosed, which comprises (1) a three-layered laminate consisting of a core layer of a biaxially oriented polyolefin film which has a birefringence of not more than 0.01 and an amorphous-region orientation coefficient of not more than 0.2 and two outer layers of a biaxially oriented polyester film adhereed to the core layer, and (2) a magnetic layer formed on at least one side of the laminate. This magnetic recording disk undergoes only a slight dimensional change with a variation in humidity and temperature, and the dimensional change is isotropic in the plane.

19 Claims, No Drawings

MAGNETIC RECORDING DISK

BACKGROUND

(1) Field of the Invention

This invention relates to a flexible magnetic recording disk with excellent dimensional stability, isotropy of dimensional changes in the disk plane, and improved electromagnetic conversion properties.

(2) Description of the Prior Art

Flexible magnetic recording disks have already been known and come into use. (Refer, for example, to U.S. Pat. No. 4,223,361.) They comprise a biaxially oriented base of polyester film and a magnetic layer formed thereon by either applying magnetic particles together with a binder or by depositing a magnetic metal material on the base surface by vacuum metallizing, sputtering, ion plating, electro-deposition or other techniques.

The known magnetic recording disks, which undergo substantial dimensional changes with humidity variations, have disadvantages in that they tend to develop off-line of the track, or track shift, and lowering or fluctuation of the output upon changes in the ambient humidity.

Magnetic recording disks based on a biaxially oriented polyolefin film have also been known in the art. Their dimensional changes with humidity are negligible but those with temperature are serious and anisotropic in the disk plane. These drawbacks, sometimes combined with unsatisfactory electromagnetic conversion properties, have held back the commercial acceptance of the polyolefin film-based disks.

SUMMARY

The present invention is aimed at providing a magnetic recording disk which undergoes only small dimensional changes with humidity, the changes with variations of temperature, humidity, and other ambient conditions being isotropic in the disk plane, and which also possesses desirable electromagnetic conversion properties. The invention thus provides a magnetic recording disk which comprises (1) a three layered laminate consisting of a core layer of a biaxially oriented polyolefin film which has a birefringence of not more than 0.01 and an amorphous-region orientation coefficient of not more than 0.2 and two outer layers of a biaxially oriented polyester film adhered to said core layer, and (2) a magnetic layer formed on at least one side of the laminate.

THE PREFERRED EMBODIMENTS

In the practice of the invention, the biaxially oriented polyolefin film to be employed is, for example, a biaxially stretched film of polyethylene, polypropylene, polybutene-1, poly-4-methylpentene-1, polystyrene, or other homopolymers or their copolymers, carboxylic acid-modified polyethylene or polypropylene, or ionomer. The preferable film is a biaxially oriented film of a polyolefin having a melting point (the peak temperature as determined by differential scanning calorimetry) of 150° C. or above, for example isotactic polypropylene or poly-4-methylpentene-1, and the most preferable film for this invention is a biaxially oriented isotactic polypropylene film.

The biaxially oriented polyolefin film for use in the invention must have a birefringence of not more than 0.01, preferably 0.005, and an amorphous-region orientation coefficient of not more than 0.2, preferably 0.1. If either exceeds the specified range, the film will have hygroscopic and thermal expansion coefficients anisotropic in the film plane and will give a magnetic disk which, when reproducing recorded signals, can exhibit track error, output fluctuation, dropout, or other inferior electromagnetic conversion properties.

According to the invention, the biaxially oriented polyolefin film is formed by melt-extruding a polyolefin polymer by an extruder through die lips into a sheet, cooling it to a solid, unstretched film, and then heating and stretching it both in the longitudinal and transverse directions. Commonly, there have been available two alternative methods for such purposes; simultaneous biaxial stretching, in which the film is stretched at the same time in the length and width directions, and successive stretching, in which the film is stretched first longitudinally and then transversely or vice versa. In this invention, the polyolefin film is advantageously stretched in any of three ways, including the conventional practice.

A. Simultaneous biaxial stretching: This process is usually performed by either a tenter or tubular method. The former is preferred because of better thickness uniformity of the stretched film.

B. Three-step successive biaxial stretching: This involves an additional longitudinal or transverse stretching of a successively biaxially stretched film.

C. Improved successive biaxial stretching: Successive biaxial stretching of an unstretched film of a polyolefin polymer containing 5 to 30% by weight of a stretch-modifier. Suitable as the modifier is a polyterpene resin or petroleum resin, especially a hydrogenated cyclopentadiene polymer.

In any case, the draw ratios in the length and width directions are desirably in the range of 3- to 12-fold, more desirably in the range of 5- to 9-fold, each.

The polyolefin film thus biaxially oriented is then sandwiched between two layers of a biaxially oriented polyester film. The latter is, for example, a film of a polymer, copolymer, or blend containing 70% or more by weight of polyethylene terephthalate, polyethylene-2,6-naphthalate, or polyethylene-bis-α,β-2-chlorophenoxy-ethane-4,4'-dicarboxylate, preferably a film of polyethylene terephthalate homopolymer. The film may contain incorporated or non-incorporated particles as a lubricant. The term "incorporated particles" as used herein means the particles formed by the reaction of catalyst residue or other additives, containing Ca, Si, Mn, Mg, Sb, Ge, P, Li, K, or Na, with a monomer or oligomer during condensation polymerization. Such particles are described in U.S. Pat. Nos. 4,138,386 and 4,067,855. Usually, their mean particle diameter ranges from 0.1 to 5 μm. By the "non-incorporated particles" is meant chemically inactive particles 0.01 to 10 μm in mean particle diameter selected from among the oxides and inorganic salts of the elements of Groups II, III, and IV of the periodic table. Examples are finely divided titanium oxide, fumed silica, and calcium carbonate. The polyester may contain a stabilizer, such as phosphoric or phosphorous acid or an ester of such acid.

The biaxially oriented polyester film to be used in the invention is made in the usual manner by melt-extruding a polyester/resin, cooling the extrudate to a solid, unstretched film, and then biaxially stretching it successively or simultaneously. Desirably, the film is stretched 3- to 6-folds both in the longitudinal and transverse directions. Also, the film is desired to have a birefringence of not more than 0.02, preferably not more than 0.015.

It is further desirable that the biaxially oriented polyester film possess an average surface roughness (Ra) of 0.001 to 0.05 μm, preferably 0.003 to 0.03 μm, on the surface side of the laminate. This is because the surface roughness in that range helps the magnetic recording disk to have satisfactory electromagnetic conversion properties.

The laminate according to the present invention consists of a biaxially oriented polyolefin film sandwiched between two layers of a biaxially oriented polyester film. This three-layered laminate is an important feature of the invention for preventing curling of the magnetic disk. Disks based on two-layered laminates instead would not lend themselves readily toward commercial production because of their greater curling tendencies.

The thickness ratio of the individual layers constituting the laminate in accordance with the invention, that is, the value of the interlayer thickness as divided by the sum of thicknesses of the both surface layers, is preferably in the range of 0.7 to 5, more desirably in the range of 1 to 4. If the ratio is below this range the resulting disk will have a too high coefficient of hygroscopic expansion, while if it exceeds the range the interlayer will adversely affect the electromagnetic conversion properties of the disk.

The interlayer itself ranges in thickness from 25 to 60 μm, preferably from 30 to 50 μm, and the both surface layers from 6 to 30 μm, preferably from 10 to 25 μm, each. In order that the disk may maintain proper electromagnetic conversion properties, it is advisable to use films with thickness irregularities within 10% for the interlayer and the both surface layers.

The magnetic recording disk of the invention has a magnetic layer formed on at least one side of the laminated base. More precisely, the disk of the invention is a magnetic recording medium made by coating a magnetic powder or metallizing or otherwise depositing a ferromagnetic metal on one side or both sides of a disk-shaped laminated base. It comes in varied sizes, including an 8-inch-diameter standard and smaller sizes such as 5-in. mini-floppy and 3-in. micro-floppy disks. For the purposes of the invention the magnetic layer may be any of the well-known layers formed by the application of a dispersion of a magnetic material, such as Co-doped γ-Fe$_2$O$_3$, γ-Fe$_2$O$_3$, CrO$_2$, or other ferromagnetic alloy particles, in an organic binder. Alternatively, it may be any ferromagnetic layer of the prior art formed of Fe, Co, Ni, or other ferromagnetic metal or a magnetic alloy containing such a metal by vacuum metallizing, sputtering, ion-plating, electro-deposition, or other similar techniques. The magnetic layer may be either horizontally or perpendicularly magnetized. Although he thickness of the magnetic layer depends on the method used for its formation, it is usually desired to come within the range of 0.05 to 5 μm. The overall thickness of the magnetic disk, including that of the magnetic layer, is desirably in the range of 40 to 90 μm.

A typical method of manufacturing the laminate and the magnetic recording disk according to the invention will now be described. A biaxially oriented polyolefin film is treated with a corona discharge on both sides to a surface wetting tension of 36 to 45 dyn/cm, and two layers of a biaxially oriented polyester film are bonded to the both sides of the base by the dry lamination technique. An adhesive may be applied to either film of polyolefin or polyester. While there is no limitation to the type of the adhesives, polyester or epoxy adhesives or the like are favorably employed. The adhesive coat is formed so that its thickness after drying is 1 to 10 μm, preferably 2 to 8 μm.

The three-layered laminated built up in this way as a base is then provided with a magnetic layer on one side or both sides in the usual manner. Finally, a disk is stamped out of the coated base as a magnetic recording disk.

The magnetic disk of the invention, based on a three-layered laminate consisting of a biaxially oriented polyolefin film having a birefringence of not more than 0.01 and an amorphous-region orientation coefficient of not more than 0.2 and sandwiched between two layers of a biaxially oriented polyester film, presents remarkable advantages as follows:

(1) Only slight dimensional changes with humidity.
(2) Dimensional changes with humidity and temperature variations are isotropic in the disk plane.
(3) Excellent electromagnetic conversion properties, with negligible track shift, output fluctuation, and dropouts.

The properties of film components and disks fabricated in conformity with the invention by way of examples were determined by the following methods:

(1) Birefringence (Δn)

A polarizing microscope equipped with a Berek compensator was used, with a sodium lamp as its light source, to measure the retardation (R), in nm, of each test piece. On the basis of this measured value, the birefringence (Δn) of the piece was calculated from the equation $$\Delta n = R/d$$

where d is the film thickness, in nm.

(2) Orientation coefficient of amorphous region (F)

Each polyolefin test film was immersed in a mixed solution of toluene, xylene, and benzene containing fluorescent molecules at 25° C. for 24 hours, and then was air dried. The polarized fluorescence intensity of the parallel component in the film plane was determined with a polarizing fluorometer, Model FOM-1, manufactured by Japan Spectroscopic Co., Ltd., and the orientation coefficient of the amorphous region (F) was calculated from the equation:

$$F = 1 - (B/A)$$

where A is the longitudinal polarized fluorescence intensity and B is the transverse polarized fluorescence intensity.

(3) Melting point

Using a differential scanning calorimeter the temperature was increased at a rate of 20° C. per minute, and the temperature which corresponded to the endothermic peak due to fusion of the sample, in an amount of 10 mg, was regarded as the melting point of the particular film. When there were two or more melting-point peaks, the higher or highest peak was chosen as the temperature representing the melting point.

(4) Coefficient of hygroscopic expansion (β)

Each specimen, with a gauge length of 150 mm and width of 10 mm, was set in an air-circulating oven under a constant load of 10 g. At a constant temperature of 20° C. and a relative humidity of 35%, the original length, Lo, in mm, was measured and then the humidity was increased to 85% RH to measure the consequent change in the length, ΔL, of the sample. The value of dimensional change was obtained by means of a differential transformer, by transforming it into a change in the quantity of electricity and recording the latter.

$$\beta = \Delta L/(L_o \times \Delta H)$$

where ΔH is the change in relative humidity, i.e., 85−35=50% RH.

(5) Coefficient of thermal expansion (α)

Each specimen, 150 mm long and 10 mm wide, was set in an air circulating oven under a constant load of 10 g. At a constant humidity of 15% RH, the original length, Lo, in mm, was measured at 20° C. and then the temperature was increased to 30° C. to measure the change in the sample length, ΔL, in mm. The value of dimensional change was obtained using a differential transformer, by transforming it into an electric quantity and recording the latter.

$$\alpha = \Delta L/(L_o \times \Delta T)$$

where ΔT is the change in temperature, i.e., 30−20=10° C.

(6) Average surface roughness (Ra)

The center line average height, in μm, of each sample was measured in conformity with ASA B46.1-1962. The cut-off at the time of measurement was 0.08 mm.

(7) Thickness (gauge) variation

The thickness of each test film was measured at 10 points, at intervals of 5 cm transversely and longitudinally of the film. The difference between the maximum and minimum measured thicknesses was divided by the average value of the 10 measurements and represented in percentage to obtain the thickness variation.

(8) Disk output

The outermost track of the test disk was recorded with a 250 kHz signal by a floppy disk drive under conditions of 20° C. and 35% RH, and then, the first output was measured in this condition. The first output obtained here was regarded as 100%. After being kept under altered conditions of 25° C. and 85% RH for 5 hours, the disk was taken out and the second output from the outermost track was again measured, to be expressed in percent as a relative value to the first 100% output. When the difference between the first and second output is large, the quality of the disk is poor because of the weakness against environmental change.

(9) Number of dropouts

The number of dropouts that occurred on both sides of each test disk was measured by the use of a drop-in drop-out counter for floppy disk, Model SK-444A, manufactured by Tokyo Engineering Co. The writing frequency used was 250 kHz.

EXAMPLES 1 TO 3

A polypropylene with an intrinsic viscosity of 1.8 (g/dl) and isotactic content of 97% was melt-extruded at 270° C. through die lips into a sheet. The sheet was solidified by cooling to obtain an unstretched film. This polypropylene film had a melting point of 165° C. Three test pieces of the film were prepared by stretching the film both longitudinally and transversely for simultaneous biaxial orientation in different draw ratios in hot air at 150° C. and heat-treating them in hot air at 160° C. for 10 seconds to obtain three biaxially oriented film pieces stretched 4-, 4.5-, and 5-fold, respectively. The birefringence and amorphous-region orientation coefficient values of these biaxially oriented polypropylene film pieces were as set out in Table 1. All the pieces showed values of not more than 0.01 in birefringence and 0.2 in amorphous-region orientation coefficient value. Each film was treated by a corona discharge on both sides and then was sandwiched between two layers of a biaxially oriented polyethylene terephthalate film "Lumirror" (produced by Toray Industries, Inc., 15 μm thick, Δn=0.013, and 0.020 μm in average surface roughness).

TABLE 1

Properties of biaxially oriented polypropylene films used

| Example | Stretching method employed | Birefringence | Amor. reg. orientn coeff. | Film thickness μm | Thickness variation % |
|---|---|---|---|---|---|
| 1 | 4-fold simul. biax. | 0.0026 | 0.05 | 45 | 4 |
| 2 | 4.5-fold simul. biax. | 0.0030 | 0.07 | 45 | 4 |
| 3 | 5-fold simul. biax. | 0.0028 | 0.07 | 30 | 3 |
| 4 | 3-step stretching | 0.0028 | 0.06 | 45 | 4 |
| 5 | Improved successive biax. stretching | 0.0021 | 0.06 | 45 | 6 |
| Comp. 2 | Usual successive biax. stretching | 0.020 | 0.85 | 75 | 5 |
| Comp. 3 | Usual successive biax. stretching | 0.019 | 0.88 | 45 | 4 |

The three-layered laminate was formed by dry lamination using polyester-isocyanate adhesives. Table 2 summarizes the lamination ratios, average surface roughnesses, and coefficients of hygroscopic and thermal expansions of the three laminates thus obtained. All the laminates showed low coefficients of hygroscopic expansion, and their hygroscopic and thermal expansions were isotropic in the laminate plane. Moreover, their average surface roughness values were all within an appropriate range of 0.020 to 0.021 μm. On both sides of these laminated bases were formed 2.5 μm-thick magnetic layers in the usual way, and disks were stamped out of the layered structures to provide magnetic recording disks of 200 mm (18 in.) in diameter. The properties of the magnetic disks thus obtained were given in Table 3. Changes in ambient conditions caused only little changes in the average outputs from the outermost tracks of the test disks and resulted in few dropouts.

TABLE 2

Properties of laminates and component films used as bases of magnetic disks

| | Structure* | Lamination ratio | AV. surface roughness, Ra, μm | Hygroscopic expans. coeff., × 10⁻⁶/% RH | | | Thermal expans. coeff., × 10⁻⁶/°C. | | |
|---|---|---|---|---|---|---|---|---|---|
| | | | | LD** | TD** | 45°*** | LD** | TD** | 45°*** |
| Example 1 | PET/PP/PET (PP: 4-fold simul. biax. stretching) | 1.5 | 0.020 | 3.9 | 3.9 | 3.9 | 26.0 | 26.2 | 26.2 |
| Example 2 | PET/PP/PET (PP: 4.5-fold simul. biax. stretching) | 1.5 | 0.021 | 3.4 | 3.4 | 3.4 | 23.0 | 22.8 | 23.1 |
| Example 3 | PET/PP/PET | 1.0 | 0.020 | 3.7 | 3.8 | 3.8 | 27.5 | 27.3 | 27.5 |

TABLE 2-continued

Properties of laminates and component films used as bases of magnetic disks

|  | Structure* | Lamination ratio | AV. surface roughness, Ra, μm | Hygroscopic expans. coeff., × $10^{-6}$/% RH | | | Thermal expans. coeff., × $10^{-6}$/°C. | | |
|---|---|---|---|---|---|---|---|---|---|
|  |  |  |  | LD** | TD** | 45°*** | LD** | TD** | 45°*** |
| Example 4 | (PP: 5-fold simul. biax. stretching) PET/PP/PET | 1.5 | 0.020 | 3.9 | 3.8 | 3.9 | 18.0 | 18.5 | 18.3 |
| Example 5 | (PP: 3-step stretching) PET/PP/PET | 1.88 | 0.016 | 3.1 | 3.1 | 3.2 | 23.5 | 23.3 | 23.4 |
| Comp. Ex. 1 | (PP: improved successive biax. stretching) PET film alone | — | 0.020 | 8.5 | 8.9 | 8.8 | 15.0 | 14.5 | 14.7 |
| Comp. Ex. 2 | PP film alone | — | 0.060 | 0.7 | 0.4 | 0.6 | 51.7 | 8.0 | 29.1 |
| Comp. Ex. 3 | (Conventional successive biax. stretching) PET/PP/PET (PP: Conventional successive biax. stretching) | 1.5 | 0.020 | 5.0 | 3.2 | 4.0 | 32.0 | 7.3 | 25.1 |

*"PP" refers to a biaxially oriented polypropylene film, "PET" a biaxially oriented polyethylene terephthalate film, and "PET/PP/PET" a three-layered laminate consisting of PP sandwiched between PET layers.
**"LD" stands for the longitudinal direction of the laminate or film, "TD" for the transverse direction, and "45°" for an oblique direction at an angle of 45° from the longitudinal.

EXAMPLE 4

A polypropylene having a melting point of 165° C. was longitudinally stretched 5 times the original length at 135° C., transversely stretched 8 times at 155° C., and again longitudinally 1.9 times at 158° C. (in three-step successive stretching) to form a 45 μm-thick biaxially oriented film. The properties of this film are shown also in Table 1. In the same manner as described in Examples 1 to 3, this film was sandwiched between two layers of "Lumirror" (15 μm thick, Δn=0.013, av. surface roughness=0.020 μm) to obtain a laminated film base. Its properties are given in Table 2. The laminate had a low coefficient of hygroscopic expansion and good isotropy in hygroscopic and thermal expansions. Three-micron-thick magnetic layers were formed on both sides of this laminate in the same way as in Examples 1 to 3, and a magnetic recording disk of 200 mm (8 in.) in diameter was obtained. As can be seen from Table 3 which shows its properties, the disk underwent a small change in the average track output with changes in ambient conditions and also showed only one dropout.

TABLE 3

Properties of magnetic recording disks

| Example | Total disk thickness, μm | Av. output of outermost track, % | | | No. of dropouts |
|---|---|---|---|---|---|
|  |  | 20° C. 35% RH | 25° C. 85% RH | Change |  |
| 1 | 83 | 100 | 97 | 3 | 1 |
| 2 | 83 | 100 | 98 | 2 | 0 |
| 3 | 70 | 100 | 97 | 3 | 0 |
| 4 | 85 | 100 | 98 | 2 | 1 |
| 5 | 75 | 100 | 97 | 3 | 1 |
| Comp. 1 | 80 | 100 | 75 | 25 | 1 |
| Comp. 2 | 80 | 100 | 95 | 5 | 20 |
| Comp. 3 | 83 | 100 | 92 | 8 | 4 |

EXAMPLE 5

A polypropylene powder having a melting point of 165° C. and intrinsic viscosity of 2.25 (g/dl) was mixed with 30% by weight of hydrogenated cyclopentadiene polymer (trade-named "Escorez", a product of Esso Chemicals). The mixture was pelletized by a conventional method, and the pellets were melt-extruded at 240° C. and forced through die lips into the form of an unstretched film. This film was longitudinally stretched 7-fold at 135° C. and transversely 8-fold at 155° C., and then heat-treated at 160° C. for 5 seconds to obtain a 45 μm-thick biaxially oriented film (in improved successive biaxial stretching). The properties of this film are included in Table 1. Next, the procedure of Examples 1 to 3 was repeated to form a laminate by sandwiching this film between two layers of "Lumirror" (thickness=12 μm, Δn=0.014, and av. surface roughness=0.015 μm). The properties of the three-layered laminate thus formed are given in Table 2. In the same manner as in Examples 1 to 3, magnetic layers of 1.5 μm thick were formed on both sides of the laminate, and a magnetic recording disk, 200 mm (8 in.) in diameter, was stamped out. As indicated in Table 3, the average track output change with changes in the ambient conditions was slight and only a single dropout occurred.

COMPARATIVE EXAMPLE 1

Both surfaces of a single layer of a 75 μm-thick biaxially oriented film of polyethylene terephthalate were coated with magnetic layers by the procedure of Examples 1 to 3 to obtain a magnetic recording disk, 200 mm (8 in.) in diameter. Its properties are shown in Table 2. It can be seen that its hygroscopic expansion coefficient is much higher than those of the laminates in Examples 1 to 5 of the present invention and hence the dimensional changes with humidity changes are greater, too. The properties of the magnetic recording disk based on this film are given in Table 3, which clearly indicates that the change in the track output due to changes in ambient conditions is far more conspicuous than those with the disks (Examples 1 to 5) of the invention.

COMPARATIVE EXAMPLE 2

Magnetic layers were formed in the same manner as described in Examples 1 to 3 on both sides of a single layer 75 μm-thick biaxially oriented polypropylene film formed by the usual successive biaxial stretching method, and a 200 mm (8 in.)-dia. magnetic recording disk was formed. Tables 1 and 2 show the properties of the base film. It is clear that, as compared with the counterparts of Examples 1 to 5, this film was very rough on the surface and its thermal expansion coefficient was widely dispersed in the film plane. Turning to Table 3 showing the properties of the magnetic disk based on this film, it is evident that the film underwent a rather substantial change in the track output with environmental changes, with far more dropouts.

COMPARATIVE EXAMPLE 3

The unstretched polypropylene film used in Examples 1 to 3 was heated to 130° C., stretched 5-fold longitudinally, further heated to 150° C., stretched 9-fold transversely, and then heat-treated with hot air at 155° C. for 5 seconds. Thus a biaxially oriented polypropylene film was formed conventionally by the successive biaxial stretching method. As is clear from Table 1, this film showed much higher birefringence and amorphous-region orientation coefficient values than the ranges specified for the present invention. This film was laminated on both sides with a biaxially oriented polyester film in the same way as in Examples 1 to 3. It will be understood from Table 2 showing its properties that the laminate is more anisotropic in both coefficients of hygroscopic and thermal expansions (that is, more variable in values according to the directions of the film) than those of Examples 1 to 5 of the present invention. The properties of a magnetic recording disk, made on the basis of this laminate but otherwise in the same manner as in Examples 1 to 3, are shown in Table 3. Clearly, the disk underwent a rather more change in the track output with changes in the ambient conditions, and had more dropouts than the disks (in Examples 1 to 5) of the invention.

We claim:

1. A magnetic recording disk which comprises (1) a three-layered laminate consisting of a core layer of a biaxially oriented polyolefin film which has a birefringence of not more than 0.01 and an amorphous-region orientation coefficient of not more than 0.2 and two outer layers of a biaxially oriented polyester film adhered to said core layer, and (2) a magnetic layer formed on at least one side of the laminate.

2. A magnetic recording disk according to claim 1, wherein the melting point of the polyolefin film is 150° C. or above.

3. A magnetic recording disk according to claim 1, wherein the polyolefin film is isotactic polypropylene film.

4. A magnetic recording disk according to claim 1, wherein the biaxially oriented polyolefin film has a birefringence of not more than 0.005 and an amorphous-region orientation coefficient of not more than 0.1.

5. A magnetic recording disk according to claim 1, wherein the polyester film is a film of polyethylene terephthalate polymer.

6. A magnetic recording disk according to claim 1, wherein the biaxially oriented polyester film has a birefringence of not more than 0.02.

7. A magnetic recording disk according to claim 1, wherein the biaxially oriented polyester film has an average surface roughness in the range of 0.001 to 0.05 $\mu$m.

8. A magnetic recording disk according to claim 1, wherein the laminate has a thickness ratio in the range of 0.7 to 5.

9. A magnetic recording disk according to claim 1, wherein the laminate has a thickness ratio in the range of 1 to 4.

10. A magnetic recording disk according to claim 1, wherein the core layer of the laminate ranges in thickness from 25 to 60 $\mu$m and the both surface layers range in thickness from 6 to 30 $\mu$m each.

11. A magnetic recording disk according to claim 1, wherein the core layer of the laminate ranges in thickness from 30 to 50 $\mu$m and the both surface layers range in thickness from 10 to 25 $\mu$m each.

12. A magnetic recording disk according to claim 1, wherein the polyolefin film constituting the core layer of the laminate has a thickness variation within 10%.

13. A magnetic recording disk according to claim 1, wherein the biaxially oriented polyolefin film is a simultaneously biaxially stretched film.

14. A magnetic recording disk according to claim 1, wherein the biaxially oriented polyolefin film is a film containing 5 to 30% by weight of a polyterpene resin or petroleum resin.

15. A magnetic recording disk according to claim 1, wherein the biaxially oriented polyolefin film is a film successively stretched in three steps in the longitudinal, transverse, and longitudinal directions of the film.

16. A magnetic recording disk according to claim 1, wherein the magnetic layer has a thickness in the range of 0.05 to 5 $\mu$m.

17. A magnetic recording disk according to claim 1, wherein the total thickness of the disk is in the range of 40 to 90 $\mu$m.

18. A magnetic recording disk according to claim 1, wherein the magnetic layer is formed of at least one material selected from the group consisting of $\gamma$-Fe$_2$O$_3$, Co-doped $\gamma$-Fe$_2$O$_3$, CrO$_2$, Fe, Co, Ni, and mixtures of at least one of these materials and a binder.

19. A magnetic recording disk according to claim 1, wherein the magnetic layer is a ferromagnetic thin film formed by one method selected from among vacuum metallizing, sputtering, ion-plating, electro-deposition, and chemical plating.

* * * * *